(No Model.)
S. VAN PATTEN.
APPARATUS FOR LOADING AND UNLOADING WAGONS.
No. 270,159. Patented Jan. 2, 1883.
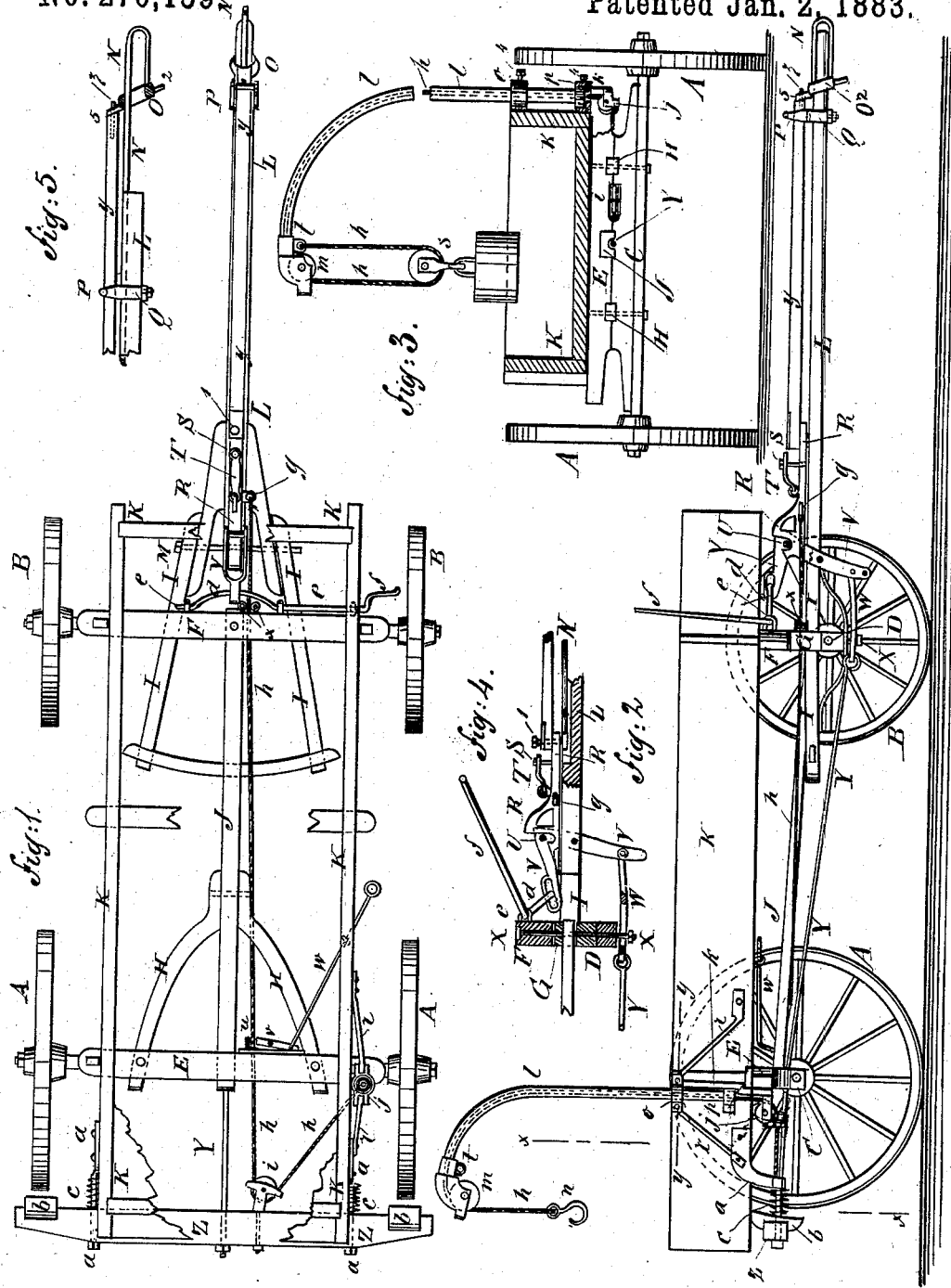
WITNESSES:
Chas. Nida.
C. Sedgwick
INVENTOR:
S. Van Patten
BY Munn & Co.
ATTORNEYS.

UNITED STATES PATENT OFFICE.

SILAS VAN PATTEN, OF DUANESBURG, NEW YORK.

APPARATUS FOR LOADING AND UNLOADING WAGONS.

SPECIFICATION forming part of Letters Patent No. 270,159, dated January 2, 1883.

Application filed October 6, 1882. (No model.)

*To all whom it may concern:*

Be it known that I, SILAS VAN PATTEN, of Duanesburg, in the county of Schenectady and State of New York, have invented certain new and useful Improvements in Apparatus for Loading and Unloading Wagons, of which the following is a full, clear, and exact description.

Reference is to be had to the accompanying drawings, forming a part of this specification, in which similar letters of reference indicate corresponding parts in all the figures.

Figure 1 is a plan view of my improvement, parts being broken away. Fig. 2 is a side elevation of the same. Fig. 3 is a sectional end elevation of the same, taken through the line $xx$, Fig. 2. Fig. 4 is a sectional side elevation of a part of the same. Fig. 5 is a side elevation, partly in section, of the forward part of tongue. Fig. 6 is a sectional plan view of a part of the derrick, taken through the line $yy$, Fig. 2. Fig. 7 is a sectional side elevation of a part of the derrick.

The object of this invention is to improve the construction of the apparatus for loading and unloading wagons, for which Letters Patent No. 251,659 were issued to me December 27, 1881, in such a manner as to make it simpler in construction, more convenient in operation, and more readily controlled.

The invention consists in the combination, with the tongue, the slotted block attached to the rod sliding in the tongue, and the brake-rod, of an elbow-lever, and a bend formed upon the shaft of the brake-lever, whereby the said sliding rod can be readily locked and unlocked. The extension-rod sliding in the tongue is strengthened by a bar attached to the sliding block and to the band attached to the U-shaped end of the extension-rod. The band attached to the U-shaped end of the extension-rod is made with a flange upon its upper side and a pin at its lower side to adapt it to serve as a stop for the neck-yoke ring. The derrick is made curved and tubular, and is provided with a pulley at its upper end to adapt it to receive the hoisting-rope. The socket-rings in which the derrick turns are provided with bushings to adapt them to receive different-sized derricks. With the rear axle of the wagon is connected a clamp operated by a rod projecting at the side of the wagon-body to grasp the hoisting-rope and hold the load when partly raised and allow the apparatus to be readjusted. To the sand-board are pivoted guide-pulleys to cause the hoisting-rope to work freely when the wagon is cramped, as will be hereinafter fully described.

A represents the rear wheels, B the forward wheels, C the rear axle, D the forward axle, E the rear bolster, F the forward bolster, G the sand-board, H the rear hounds, I the forward hounds, J the reach, and K the body, of an ordinary wagon. L is the tongue, which is connected with the forward hounds, I, by a bolt, M, in the ordinary manner.

In the upper side of the tongue L is formed a longitudinal groove, in which is placed a rod, N. The rod N forms an extension-tongue, and its forward end is bent downward and rearward into U-form, and has a ring-band, O, attached to it, through which the end of the tongue L passes when the rod N is in its normal position. The forward part of the rod N is kept in place in the groove of the tongue L by a clip, P, the arms of which pass through a yoke, Q, placed beneath the tongue L, and have nuts screwed upon them. The groove in the tongue L is made dovetailed in shape, and is faced with metal to prevent wear, and into it is fitted a dovetailed block, R, attached to or formed upon the rear end of the rod N, so as to prevent the rear end of the said rod from rising out of the said groove as the said rod slides forward and backward. The doubletree is designed to be secured to the block R by a bolt, S, and hammer-strap T, as indicated in Fig. 4. The rear part of the block R projects upward, and has its rear upper corner rabbeted, and a slot or notch formed in the shoulder of the said rabbet to receive a pin, U, formed upon or attached to the angle of the elbow-lever V, which is made double, and has its lower arm pivoted to the side of the tongue L. The lower arm of the elbow-lever V projects below the tongue L, and to its end is attached the forward end of a link, W, which passes back beneath the axle D, is placed upon the lower end of the king-bolt X, and is supported in place by a nut screwed upon the end of the said king-bolt X.

To the rear end of the link W is hinged the forward end of the rod Y, which passes back beneath the reach J, passes through the rear axle, C, and is attached to the brake-bar Z. The brake-bar Z is supported by and slides forward and back upon arms $a$, attached to the rear parts of the side-boards of the wagon-body K, and is held back to keep the brake-shoes $b$ out of contact with the wheels A by springs $c$, placed upon the said arms $a$.

The upper arm of the elbow-lever V projects back above the rear end of the tongue L, and has a short slot formed in it to receive the bend $d$ of the shaft $e$, which works in the eyes of the eyebolts or other suitable bearings attached to the forward side of the forward bolster, F.

Upon the end of the shaft $e$ is formed or to it is attached a lever, $f$, which projects upward at the side of the wagon-body K, into such a position that it can be readily reached and operated by the driver with his foot. The bend $d$ and the lever $f$ stand about at right angles with each other. With this construction, when the lever $f$ is in an upright position and a rearward pressure is applied to the tongue L, the said pressure will be sustained by the bend $d$ of the shaft $e$ and the upper arm of the elbow-lever V, so that the wagon can be backed without applying the brake. When a rearward pressure is applied to the tongue L and the lever $f$ is pressed forward at the same time, the bend $d$ and the upper arm of the elbow-lever V will be pressed downward out of line, and the rearward pressure upon the tongue and the forward pressure upon the lever will act together to apply the brake. The brake can be applied by means of the lever $f$ alone when desired, and by moving the said lever forward through the arc of a quadrant the bend $d$ will take a vertical position, and the brake will be locked against the wheels, and the extension-rod N of the tongue L will be free to move forward and back without affecting the brake.

The rear end of the slotted block R is inclined, as shown in Figs. 3 and 4, so that when the lever $f$ is in a vertical position and the extension-rod N is pushed back the said inclined end will raise the pin U automatically and allow it to drop into the slot of the said block, locking the said extension-rod in place.

To an eye, $g$, formed upon or attached to the side of the block R of the extension-rod N, is attached the end of a rope, $h$, which passes through a guide-hole between the bolster F and the sand-board G, passes around a guide-pulley, $i$, pivoted to a support attached to the brake-bar Z, passes around a guide-pulley, $j'$, pivoted to a support formed upon or attached to the bar $k$, secured to the wagon-body K or bolster E, passes through the hollow curved derrick $l$, pivoted to the said bar $k$, passes around a pulley, $m$, pivoted to supports attached to the upper end of the derrick $l$, and has a hook, $n$, or other suitable grapple attached to its end. The lower part of the derrick $l$ passes through a ring, $o$, formed upon the upper end of the bar $k$, and the lower end of the said derrick $l$ enters a ring, $p$, formed upon the lower part of the said bar $k$ and rests upon an interior shoulder, $q$, formed upon or attached to the lower part of the said ring. The shoulder $q$ should be made of steel or other suitable material to prevent it from being worn by the end of the derrick $l$. The bar $k$ is strengthened in position by braces $r$, the upper ends of which are secured to lugs formed upon the opposite sides of the ring $o$, and their lower ends are attached to the side-board of the wagon-body K. The interior of the socket-rings $o$ $p$ is made large, and into the said rings are fitted bushings 3, which are kept in place by set-screws 4 or other suitable means, so that derricks of different sizes can be used, as the weight of the loading to be handled may require.

When heavy material is to be loaded upon or unloaded from the wagon the rope $h$ is drawn out, the grapple $n$ is attached to the said load, and the lever $f$ is operated to release the block R of the sliding extension-rod L. The horses are then driven forward, drawing forward the rod L, block R, and rope $h$ until the load has been raised above the upper edge of the wagon-body K, when the derrick $l$ is swung around to bring the load over or away from the wagon, and the horses are backed to lower the load into the desired place. When the load is very heavy the rope $h$ can be passed through a pulley-block, $s$, and its end attached to an eye, $t$, formed upon the derrick $l$, near its upper end, as illustrated in Fig. 3. In this case it will be necessary to move the extension-rod L out and in two or more times in raising the load upon or lowering it from the wagon. To enable this to be done the rope $h$, where it passes through the rear axle, C, is clamped against a stationary block or support, $u$, attached to the said axle by a lever, $v$, pivoted to a support attached to the axle and operated by a rod, $w$, attached to its outer end, the said rod passing out through a keeper attached to the bottom of the wagon-body K.

The end of the rod $w$ projects at the side of the wagon-body K, so that it can be conveniently reached and operated.

To the forward side of the sand-board G, upon each side of the hole through which the rope $h$ passes, is pivoted a pulley, $x$, so that the said rope will work freely when the wagon is cramped.

When the apparatus is to be used for handling heavy loads the rod N can be stiffened and strengthened by a bar, $y$, placed upon the upper side of the tongue L. The forward end of the bar $y$ has a pin, $z$, formed upon or attached to it, which passes through a hole in the flange 5, formed upon the upper part of the band O. The rear end of the bar $y$ is secured to the forward end of the block R by a bolt, 1, and nut. When light loading is to be handled the bar $y$ need not be used.

The band O is placed in an inclined position, and has a pin, 2, attached to or formed upon its lower side to adapt it to serve as a stop for the neck-yoke ring when backing and holding back.

Having thus fully described my invention, I claim as new and desire to secure by Letters Patent—

1. In an apparatus for loading and unloading wagons, the combination, with the tongue L, the slotted block R, attached to the sliding rod N, and the brake-rod W Y, of the elbow-lever V, and the bend d, formed upon the shaft e, of the brake-lever f, substantially as herein shown and described, whereby the sliding rod can be readily locked and unlocked, as set forth.

2. In an apparatus for loading and unloading wagons, the combination, with the tongue L, the sliding slotted block R, the extension-rod N, and the band O, of the separable bar y, substantially as herein shown and described, whereby the said extension-rod is stiffened and strengthened, as set forth.

3. In an apparatus for loading and unloading wagons, the combination, with the extension-rod N, having U-shaped end, and the tongue L, of the band O, having flange 5 and pin 2, substantially as herein shown and described, to adapt the said band to serve as a stop for the neck-yoke ring, as set forth.

4. In an apparatus for loading and unloading wagons, the derrick l, made curved and tubular, and provided with a pulley, m, substantially as herein shown and described, to adapt it to receive the hoisting-rope h, as set forth.

5. In an apparatus for loading and unloading wagons, the combination, with the socket-rings o p, of the bushings 3, substantially as herein shown and described, to adapt the said socket-rings to receive different-sized derricks, as set forth.

6. In an apparatus for loading and unloading wagons, the combination, with the hoisting-rope h and the rear axle, C, of the clamp u v and the rod w, substantially as herein shown and described, whereby the said hoisting-rope can be readily locked to support the load when partly raised, as set forth.

7. In an apparatus for loading and unloading wagons, the combination, with the sand-board G and the hoisting-rope h, of the pulleys x, substantially as herein shown and described, whereby the said hoisting-rope is made to work freely when the wagon is cramped, as set forth.

SILAS VAN PATTEN.

Witnesses:
  EMMETT O'NEILL,
  ETTEN SCHEMMERHORN.